United States Patent
Matsumura (10) Patent No.: US 9,539,959 B2
(45) Date of Patent: Jan. 10, 2017

(54) STRUCTURE FOR ATTACHING BAND CLIP TO CORRUGATED TUBE

(71) Applicant: Sumitomo Wiring Systems, Ltd., Yokkaichi, Mie (JP)

(72) Inventor: Yutaka Matsumura, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/028,609

(22) PCT Filed: Oct. 1, 2014

(86) PCT No.: PCT/JP2014/076245
§ 371 (c)(1),
(2) Date: Apr. 11, 2016

(87) PCT Pub. No.: WO2015/060079
PCT Pub. Date: Apr. 30, 2015

(65) Prior Publication Data
US 2016/0254654 A1 Sep. 1, 2016

(30) Foreign Application Priority Data
Oct. 22, 2013 (JP) ................................. 2013-219103

(51) Int. Cl.
*F16L 3/00* (2006.01)
*H01R 43/00* (2006.01)
(Continued)

(52) U.S. Cl.
CPC ........... *B60R 16/0215* (2013.01); *B65D 63/00* (2013.01); *F16B 2/08* (2013.01); *F16B 5/0685* (2013.01);
(Continued)

(58) Field of Classification Search
CPC .......... H02G 3/32; H02G 3/04; H02G 3/0468; B60R 16/0215; B65D 63/00; B65D 2563/108; F16B 2/08; F16B 5/0685; H01B 7/0045
(Continued)

(56) References Cited

U.S. PATENT DOCUMENTS 4,248,459 A * 2/1981 Pate ...................... F16L 3/1236
174/665
5,390,876 A * 2/1995 Hatano ................. F16L 3/1075
248/68.1
(Continued)

FOREIGN PATENT DOCUMENTS

| JP | 2005295730 A | 10/2005 |
| JP | 2006223087 A | 8/2006 |
| JP | 2013150406 A | 8/2013 |

OTHER PUBLICATIONS

International Search Report and Written Opinion for application No. PCT JP2014076245 dated Dec. 16th, 2014, 7 pages.
(Continued)

*Primary Examiner* — Anita M King
(74) *Attorney, Agent, or Firm* — Reising Ethington, P.C.

(57) ABSTRACT

A structure for attaching a band clip to a corrugated tube, provided with a corrugated tube having pluralities of ring-shaped ribs and of ring-shaped grooves; and a band clip for fixing the corrugated tube to an attachment target object. The band clip has projecting portions arranged to be separated from each other in an axial direction. The corrugated tube is configured such that the projecting portions are respectively fittable into ring-shaped grooves that are symmetrically arranged with a ring-shaped rib being interposed therebetween. Protruding portions that are engageable with the projecting portions are provided such that two protruding portions, one for every 180°, are provided for each ring-shaped groove. The protruding portions provided for one ring-shaped groove and for another ring-shaped groove are
(Continued)

arranged such that respective phases thereof are shifted from each other by 90° in a circumferential direction.

4 Claims, 8 Drawing Sheets (51) Int. Cl.
*B60R 16/02* (2006.01)
*F16B 2/08* (2006.01)
*H02G 3/30* (2006.01)
*H02G 3/32* (2006.01)
*F16B 5/06* (2006.01)
*B65D 63/00* (2006.01)
*H01B 7/00* (2006.01)
*H02G 3/04* (2006.01)

(52) U.S. Cl.
CPC .............. *H01B 7/0045* (2013.01); *H02G 3/04* (2013.01); *H02G 3/0468* (2013.01); *H02G 3/30* (2013.01); *H02G 3/32* (2013.01); *B65D 2563/108* (2013.01)

(58) Field of Classification Search
USPC ......................................................... 248/74.3
See application file for complete search history.

(56) References Cited

U.S. PATENT DOCUMENTS 6,595,473 B2 *  7/2003  Aoki ................... B60R 16/0215
                                                          138/108
6,875,918 B2 *  4/2005  Sudo ....................... H02G 3/06
                                                          138/108
6,948,241 B2 *  9/2005  Tadokoro ............. H02G 3/0468
                                                          174/102 D

OTHER PUBLICATIONS

English Translation of International Search Report for application No. PCT JP2014076245 dated Dec. 16th, 2014, 2 pages.

* cited by examiner

STRUCTURE FOR ATTACHING BAND CLIP TO CORRUGATED TUBE

CROSS REFERENCE TO RELATED APPLICATIONS

This application claims the priority of Japanese patent application JP2013-219103 filed on Oct. 22, 2013, the entire contents of which are incorporated herein.

TECHNICAL FIELD

The present invention relates to a structure for attaching a band clip to a corrugated tube.

BACKGROUND ART

Generally speaking, in order to fix a corrugated tube for protecting the outer periphery of a wire harness to a vehicle body or the like, a band-type clip (hereinafter referred to as "band clip") is often used, considering the cost and the installation area size.

A band clip is configured to have a loop shape when a belt portion is inserted into a buckle portion, and, in this state, to be able to clamp the outer periphery of a corrugated tube when the belt portion is fastened. It is possible to fix the corrugated tube to a vehicle body or the like by inserting a clip portion of the band clip, which is clamping the corrugated tube, into a fixing hole formed in the vehicle body or the like.

However, since the inner circumferential surface of the belt portion of such a band clip is likely to slip along the outer circumferential surface of the corrugated tube, the band clip might unintentionally rotate in the circumferential direction relative to the corrugated tube, and workability when attaching the corrugated tube to the vehicle body or the like is poor.

In order to eliminate such a problem, there is a conventionally-known band clip attaching structure in which a plurality of protruding portions are provided on the inner circumferential surface of the band clip, particularly on the inner circumferential surface of the belt portion, along the longitudinal direction such that the plurality of protruding portions dig into the outer circumferential surface of the corrugated tube when the belt portion is fastened to the corrugated tube, and the band clip is thus prevented from rotating (see JP2013-46505A, for example).

SUMMARY OF INVENTION

However, the conventional band clip attaching structure has the problem that, if the belt portion of the band clip is not sufficiently fastened, the plurality of protruding portions cannot sufficiently dig into the corrugated tube, and the band clip cannot be reliably prevented from rotating.

Also, if the belt portion is too tightly fastened, although the band clip can be prevented from rotating, the following problems arise.

Figure 9:
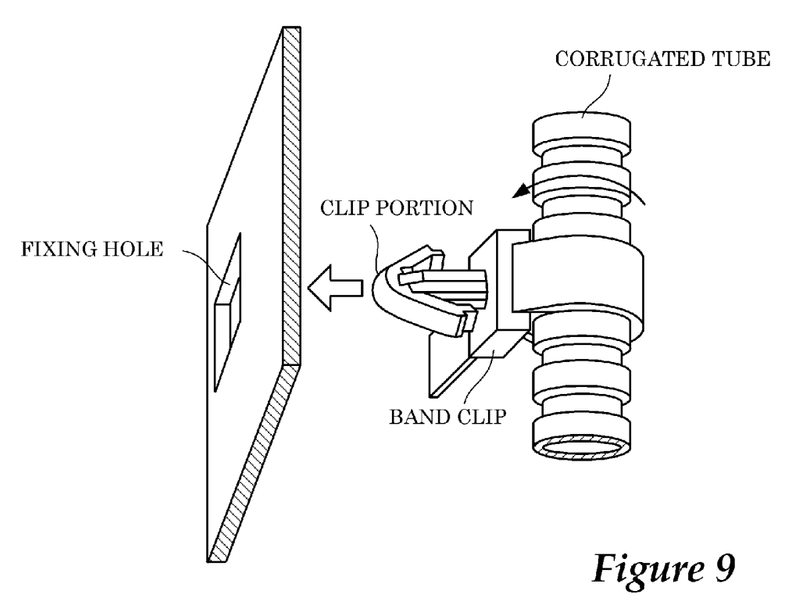
FIG. 9 is a perspective view showing a situation in which an insertion direction of a clip portion of a band clip is displaced relative to a fixing hole.

Specifically, as shown in FIG. 9, if the insertion direction of the clip portion (the direction indicated by the thick arrow shown in the drawing) is displaced relative to the fixing hole, it is necessary to twist the corrugated tube in the direction indicated by the thin arrow shown in the drawing such that the insertion direction of the clip portion matches with the fixing hole, in order to insert the clip portion into the fixing hole. For this reason, there is the risk of the wire harness breaking due to the corrugated tube being twisted, and workability when attaching the corrugated tube to a vehicle body or the like is degraded due to the need for twisting work for the corrugated tube.

In order to solve such problems, it is desirable to be able to easily adjust the attachment angle of the band clip without twisting the corrugated tube.

The present design is made in view of the above-described situation, and aims to provide a structure for attaching a band clip to a corrugated tube, with which, while the band clip attached to the corrugated tube is prevented from rotating, it is easy to adjust the attachment angle of the band clip without twisting the corrugated tube.

To achieve the above-described aim, a structure for attaching a band clip to a corrugated tube according to one embodiment is provided with: a corrugated tube that has a plurality of ring-shaped ribs and a plurality of ring-shaped grooves, and that is for enclosing a wire harness; and a band clip for fixing the corrugated tube to an attachment target object. The band clip has a plurality of projecting portions that project toward an outer circumferential surface of the corrugated tube when the band clip is attached to the corrugated tube, and that are arranged to be separated from each other such that a distance therebetween in an axial direction of the corrugated tube is greater than or equal to widths of the ring-shaped ribs in the axial direction. The corrugated tube is configured such that the projecting portions are respectively fittable into a pair of ring-shaped grooves that are symmetrically arranged, with at least one ring-shaped rib, out of the plurality of ring-shaped ribs, being interposed therebetween. The pair of ring-shaped grooves are each provided with a plurality of protruding portions that are engageable with the projecting portions and that are arranged at predetermined intervals in a circumferential direction. The plurality of protruding portions provided for one ring-shaped groove out of the pair of ring-shaped grooves, and the plurality of protruding portions provided for the other ring-shaped groove, are arranged such that respective phases thereof are shifted from each other in the circumferential direction.

With this configuration, the structure for attaching a band clip to a corrugated tube according to one embodiment is configured such that the projecting portions of the band clip are respectively fitted into a pair of ring-shaped grooves of the corrugated tube when the band clip is attached to the corrugated tube. Also, the projecting portions of the band clip are configured to be restricted from moving in the circumferential direction in the state of being fitted into a pair of ring-shaped grooves, due to a plurality of protruding portions provided for the pair of ring-shaped grooves of the corrugated tube. Therefore, the structure for attaching a band clip to a corrugated tube according to one embodiment is capable of preventing the band clip attached to the corrugated tube from rotating.

Also, in the structure for attaching a band clip to a corrugated tube according to one embodiment, the plurality of protruding portions provided for one ring-shaped groove out of the pair of ring-shaped grooves, and the plurality of protruding portions provided for the other ring-shaped groove, are arranged such that their respective phases are shifted from each other in the circumferential direction. Therefore, the projecting portions fitted into the ring-shaped grooves are allowed to move in the circumferential direction between a protruding portion of the one ring-shaped groove and a protruding portion of the other ring-shaped groove. Consequently, when attaching the corrugated tube to the attachment target object, even if the attachment angle of the band clip is displaced relative to the attachment target object, it is easy to adjust the attachment angle of the band clip without twisting the corrugated tube.

In the structure for attaching a band clip to a corrugated tube according to one embodiment, it is preferable that the protruding portions are provided such that two protruding portions, one for every 180°, are provided for each of the pair of ring-shaped grooves, and the protruding portions provided for the one ring-shaped groove and the protruding portions provided for the other ring-shaped groove are arranged such that respective phases thereof are shifted from each other by 90° in the circumferential direction.

With this configuration, in the structure for attaching a band clip to a corrugated tube according to embodiment, the protruding portions provided for one ring-shaped groove and the protruding portions provided for the other ring-shaped groove are arranged such that their respective phases are shifted from each other by 90° in the circumferential direction. Therefore, the projecting portions are allowed to move in the circumferential direction of the corrugated tube within the range of 90°.

Also, two protruding portions, one for every 180° in the circumferential direction, are arranged such that the phases of the two protruding portions of one ring-shaped groove and the phases of the two protruding portions of the other ring-shaped groove are shifted from each other by 90°. Therefore, the bending direction of one ring-shaped groove of the corrugated tube and the bending direction of the other ring-shaped groove can be set to be orthogonal to each other. Consequently, it is possible to achieve balanced bendability of the corrugated tube, with which the corrugated tube is free from the problem of being likely to bend only in one direction, and it is possible to ensure preferable bendability.

Furthermore, in the structure for attaching a band clip to a corrugated tube according to one embodiment, it is preferable that widths of the protruding portions in the axial direction are set to be smaller than widths of the ring-shaped grooves in the axial direction.

With this configuration, in the structure for attaching a band clip to a corrugated tube according to embodiment, it is possible to achieve a configuration in which any protruding portion of the corrugated tube does not come into contact with a pair of ring-shaped ribs that are symmetrically arranged. Consequently, a gap is formed between each protruding portion and a pair of ring-shaped ribs that are asymmetrically arranged, and the corrugated tube is allowed to bend due to the presence of the gap. For this reason, it is possible to ensure preferable bendability of the corrugated tube.

With the present design, it is possible to provide a structure for attaching a band clip to a corrugated tube, with which, while the band clip attached to the corrugated tube is prevented from rotating, it is easy to adjust the attachment angle of the band clip without twisting the corrugated tube.

DESCRIPTION OF EMBODIMENTS

The following describes a structure for attaching a band clip to a corrugated tube according to one embodiment with reference to the drawings.

Figure 1:
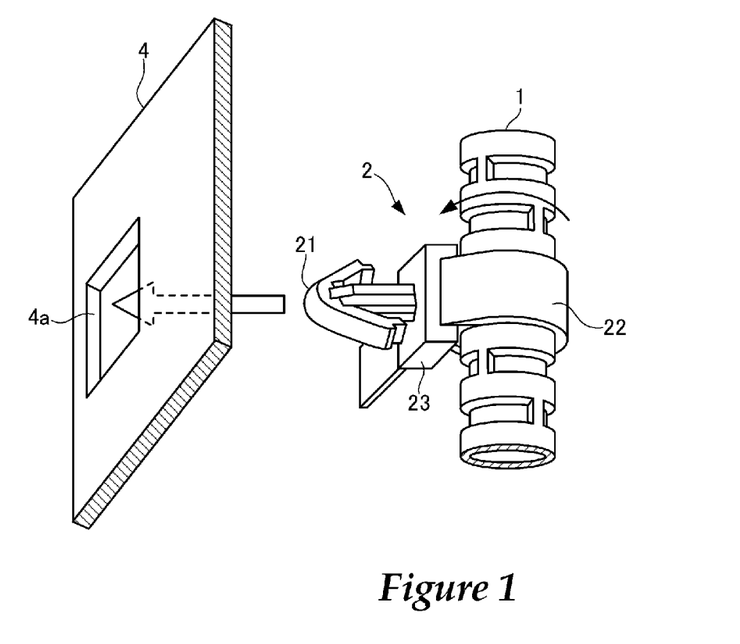
FIG. 1 is a perspective view showing a situation in which a band clip has been attached to a corrugated tube according to one embodiment of the present invention.

The present embodiment describes, as shown in FIG. 1, a structure for attaching a band clip 2, with which, when attaching the band clip 2 to a corrugated tube 1 for enclosing a wire harness (not shown in the drawing) for routing wires in a car or the like, it is easy to adjust the attachment angle of the band clip 2, while the band clip 2 is restricted from rotating in the circumferential direction (the direction indicated by the arrow shown in the drawing) relative to the corrugated tube 1. Here, the attachment angle of the band clip 2 refers to the angle of rotation of the band clip 2 in the circumferential direction of the corrugated tube 1 after the band clip 2 has been attached to the corrugated tube 1.

Figure 2A:
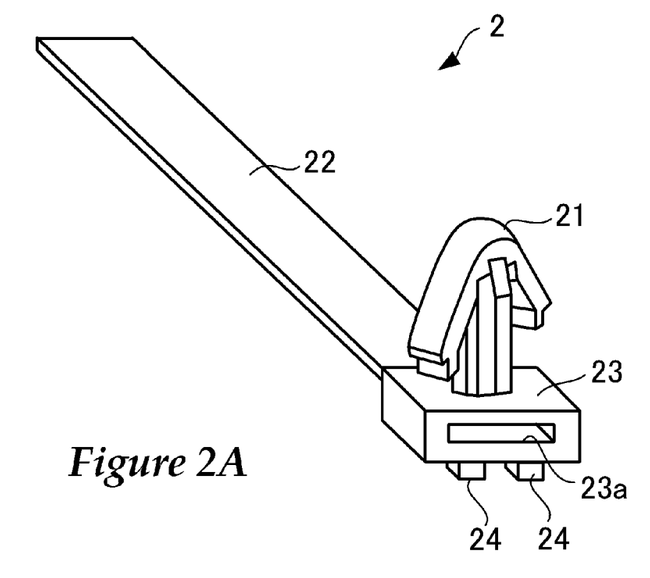
FIG. 2A is a perspective view of the band clip according to one embodiment, in which the clip portion side of the band clip is illustrated as the upper surface.

As shown in FIG. 2A, the band clip 2 according to the present embodiment includes a clip portion 21, a belt portion 22, and a clip locking portion 23.

The clip portion 21 is provided on the clip locking portion 23, and is to be inserted into an attachment hole 4a formed in an attachment target object 4 (see FIG. 1) such as a reinforcement in the body panel or the instrument panel of a car, thereby fixing the band clip 2 to the attachment target object 4. With this configuration, the corrugated tube 1 is fixed to the attachment target object 4, with the band clip 2 being interposed therebetween.

The belt portion 22 is a belt that has ends and that extends from the clip locking portion 23 so as to have a predetermined length. The belt portion 22 is made from flexible resin material, and is configured such that a free end thereof is to be inserted into a belt insertion hole 23a, which is described below, of the clip locking portion 23 when the belt portion 22 is wound around the corrugated tube 1.

Also, although not shown in the drawings, the belt portion 22 is provided with a plurality of locking grooves that are to be locked by a locking piece provided within the belt insertion hole 23a described below. Note that the configuration for locking the free end side of the belt portion 22 into the belt insertion hole 23a is not limited to locking grooves.

The clip locking portion 23 has the function of locking the belt portion 22 wound around the corrugated tube 1. Specifically, the belt insertion hole 23a, into which the belt portion 22 is to be inserted from the free end side, is formed in the clip locking portion 23. This belt insertion hole 23a is provided with a locking piece that locks a locking groove of the belt portion 22, which is not shown in the drawing.

Therefore, when the belt portion 22 is inserted into the belt insertion hole 23a from the free end side, the locking piece locks one of the plurality of locking grooves of the belt portion 22. Consequently, the belt portion 22 is prevented from coming off of the belt insertion hole 23a.

Figure 2B:
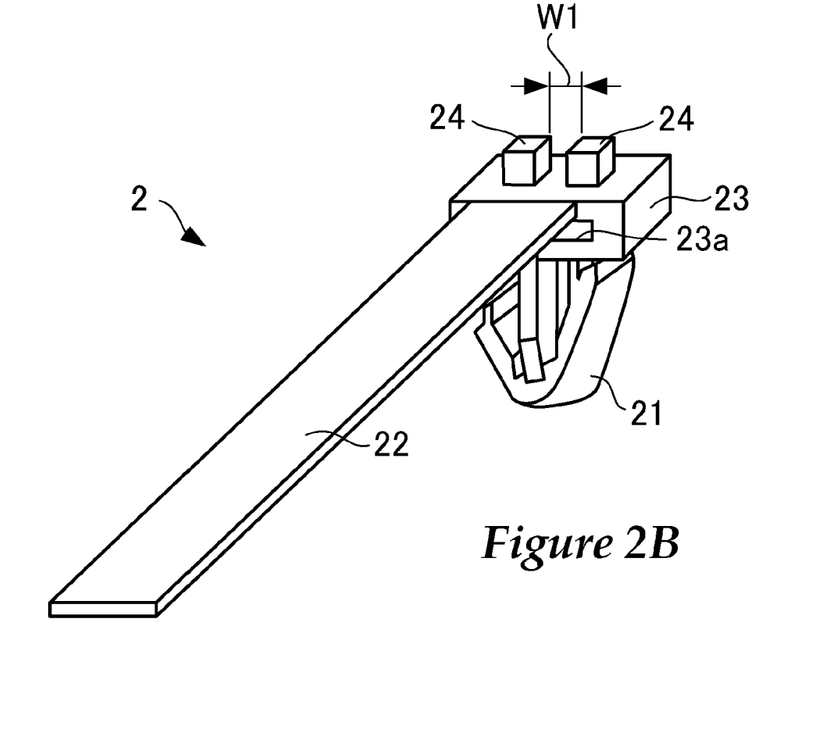
FIG. 2B is a perspective view of the band clip according to one embodiment, in which the projecting portion side of the band clip is illustrated as the upper surface.

Also, as shown in FIG. 2B, the clip locking portion 23 is provided with two projecting portions 24 on the surface that is opposite the surface on which the clip portion 21 is formed.

Each projecting portion 24 is configured to project toward the outer circumferential surface of the corrugated tube 1 when the band clip 2 is attached to the corrugated tube 1. These projecting portions 24 are configured to be fitted into ring-shaped grooves 11 (see FIG. 3), which are described below, of the corrugated tube 1 when the band clip 2 is attached to the corrugated tube 1.

Specifically, the two projecting portions 24 are configured such that, when the band clip 2 is attached to the corrugated tube 1, the two projecting portions 24 are respectively fitted into a pair of ring-shaped grooves 11 that are symmetrically arranged, with one ring-shaped rib 10, out of a plurality of ring-shaped ribs 10, being interposed therebetween. In the present embodiment, the pair of ring-shaped grooves 11 are symmetrically arranged so as to be adjacent to each other, with one ring-shaped rib 10, out of the plurality of ring-shaped ribs 10, being interposed therebetween.

Also, these projecting portions 24 are arranged to be separated from each other such that a distance W1 therebetween in the axial direction (the left-right direction in the drawing) of the corrugated tube 1 is greater than or equal to widths W2, in the axial direction (see FIG. 4), of ring-shaped ribs 10 of the corrugated tube 1, which are described below. Consequently, when the band clip 2 is attached to the corrugated tube 1, each projecting portion 24 can be fitted into a ring-shaped groove 11 without striking against the ring-shaped rib 10.

The height, i.e., the length in the direction of projection, of each projecting portion 24 is set to be smaller than at least the depths of the ring-shaped grooves 11, i.e., the length from the outer circumferential surfaces of the ring-shaped ribs 10 to the bottom surfaces of the ring-shaped grooves 11. Consequently, when the band clip 2 is attached to the corrugated tube 1, no gap is formed between the clip locking portion 23 and the outer circumferential surface of the corrugated tube 1, and the clip locking portion 23 and the outer circumferential surface of the corrugated tube 1 can be brought into close contact with each other.

Figure 3:
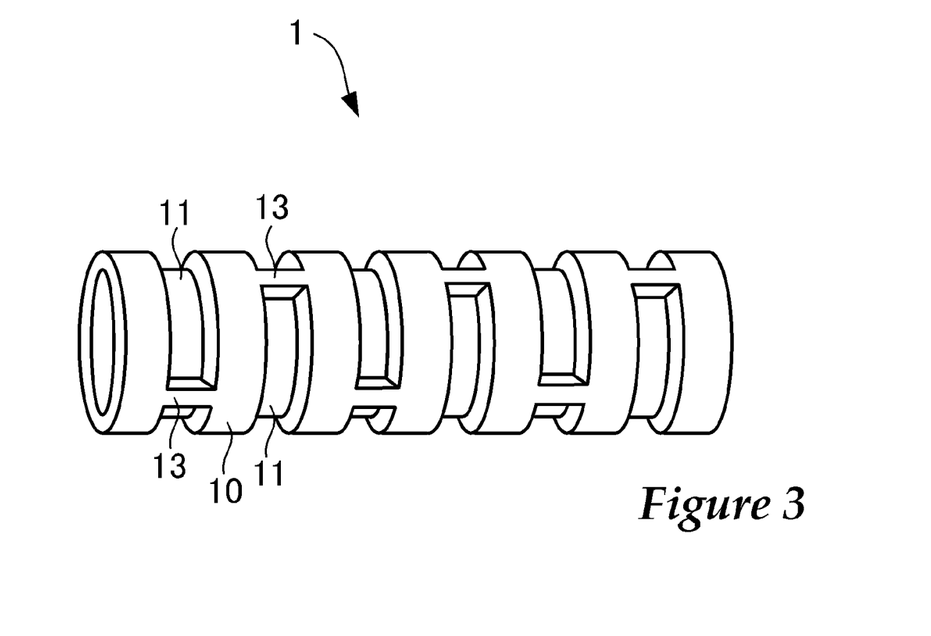
FIG. 3 is a perspective view of the corrugated tube according to one embodiment.
Figure 4:
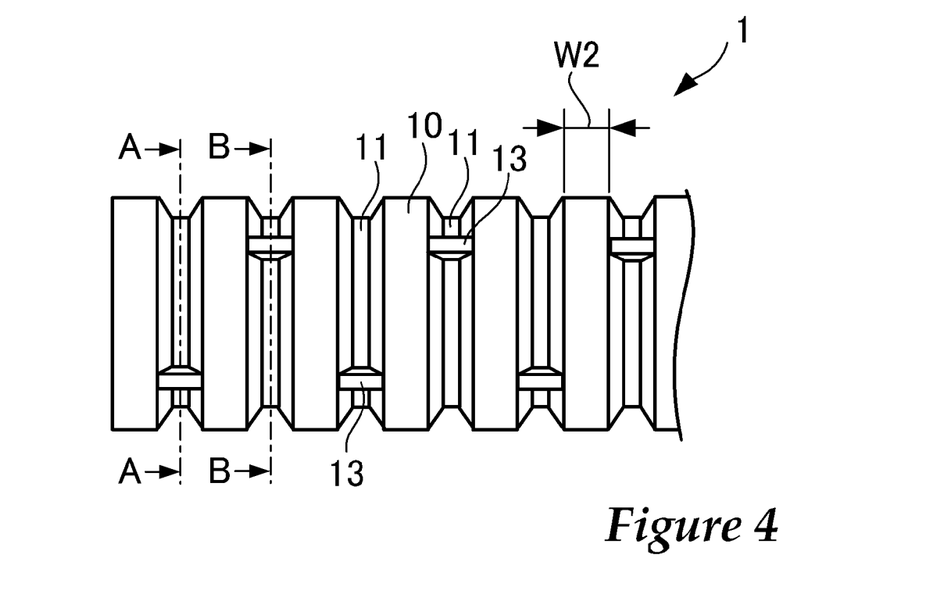
FIG. 4 is a plan view of the corrugated tube according to one embodiment.

As shown in FIG. 3 and FIG. 4, the corrugated tube 1 is a cylindrical member that has, due to having a so-called bellows structure, flexibility in the longitudinal direction, i.e., the axial direction that is orthogonal to the circumferential direction of the corrugated tube 1. The corrugated tube 1 is configured to enclose a wire harness therein.

Specifically, the corrugated tube 1 has a plurality of ring-shaped ribs 10 and a plurality of ring-shaped grooves 11, which are arranged in the axial direction at predetermined intervals. The corrugated tube 1 is an integrally formed member made from thermoplastic resin such as polyamide (PA), polypropylene (PP), polybutyleneterephtalate (PBT), or ABS resin.

In the corrugated tube 1, a cut that extends along the axial direction, not shown in the drawing, is formed. Thus, the corrugated tube 1 is configured to make it possible to form a gap therein along the axial direction by pulling apart both sides of the cut using a predetermined jig, and to make it possible to insert a wire harness into the inside from the gap.

The widths of the ring-shaped grooves 11 in the axial direction are set to be greater than or equal to the widths of the projecting portions 24 of the band clip 2 in the axial direction, and thus the projecting portions 24 can be fitted into ring-shaped grooves 11. Also, each ring-shaped groove 11 has a plurality of protruding portions 13 provided at predetermined intervals along the circumferential direction.

Figure 5A:
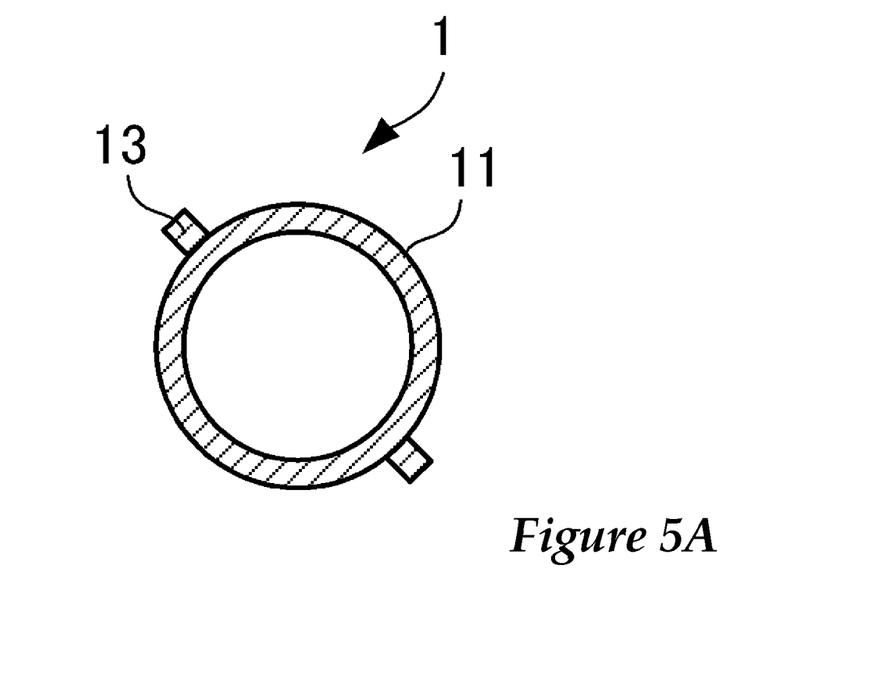
FIG. 5A is an end elevational view of the corrugated tube shown in FIG. 4 along A-A.
Figure 5B:
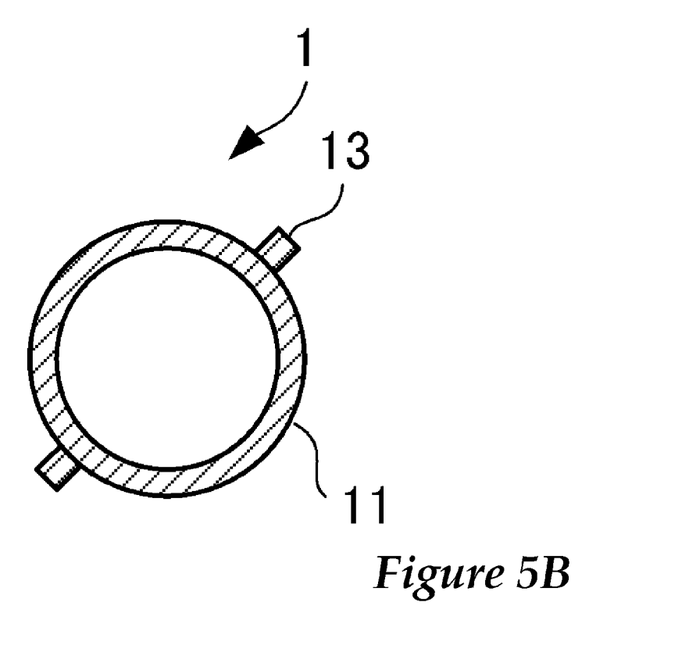
FIG. 5B is an end elevational view of the corrugated tube shown in FIG. 4 along B-B.

In the present embodiment, a plurality of protruding portions 13 provided for one ring-shaped groove 11, out of a pair of ring-shaped grooves 11 that are adjacent to each other, and a plurality of protruding portions 13 provided for the other ring-shaped groove 11, are arranged such that their respective phases are shifted from each other in the circumferential direction as shown in FIG. 5A and FIG. 5B.

Figure 5C:
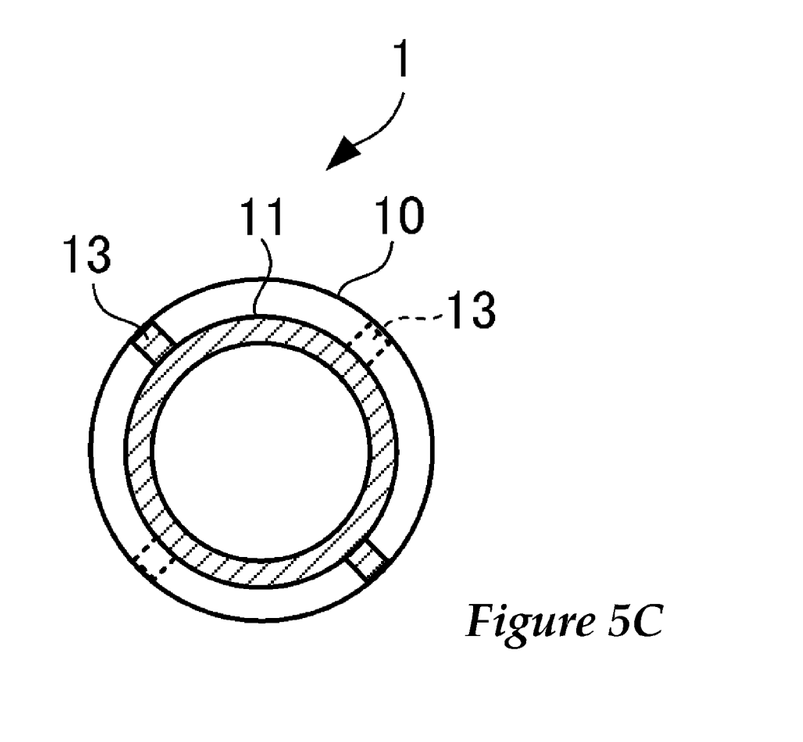
FIG. 5C is a cross-sectional view of the corrugated tube shown in FIG. 4 along A-A.

More specifically, as shown in FIG. 5A, FIG. 5B, and FIG. 5C, two protruding portions 13, one for every 180°, are provided for each ring-shaped groove 11. Also, a plurality of protruding portions 13 provided for one ring-shaped groove 11 out of a pair of ring-shaped grooves 11 that are adjacent to each other and a plurality of protruding portions 13 provided for the other ring-shaped groove 11 are arranged such that their respective phases are shifted by 90° from each other in the circumferential direction. Note that the number of protruding portions 13 is not limited to two, and may be three or more. However, it is preferable that the number is two, considering the bendability of the corrugated tube 1.

The protruding portions 13 each have a rib shape for coupling, in the axial direction, a pair of ring-shaped ribs 10 that are adjacent to each other with a ring-shaped groove 11 being interposed therebetween.

Figure 6:
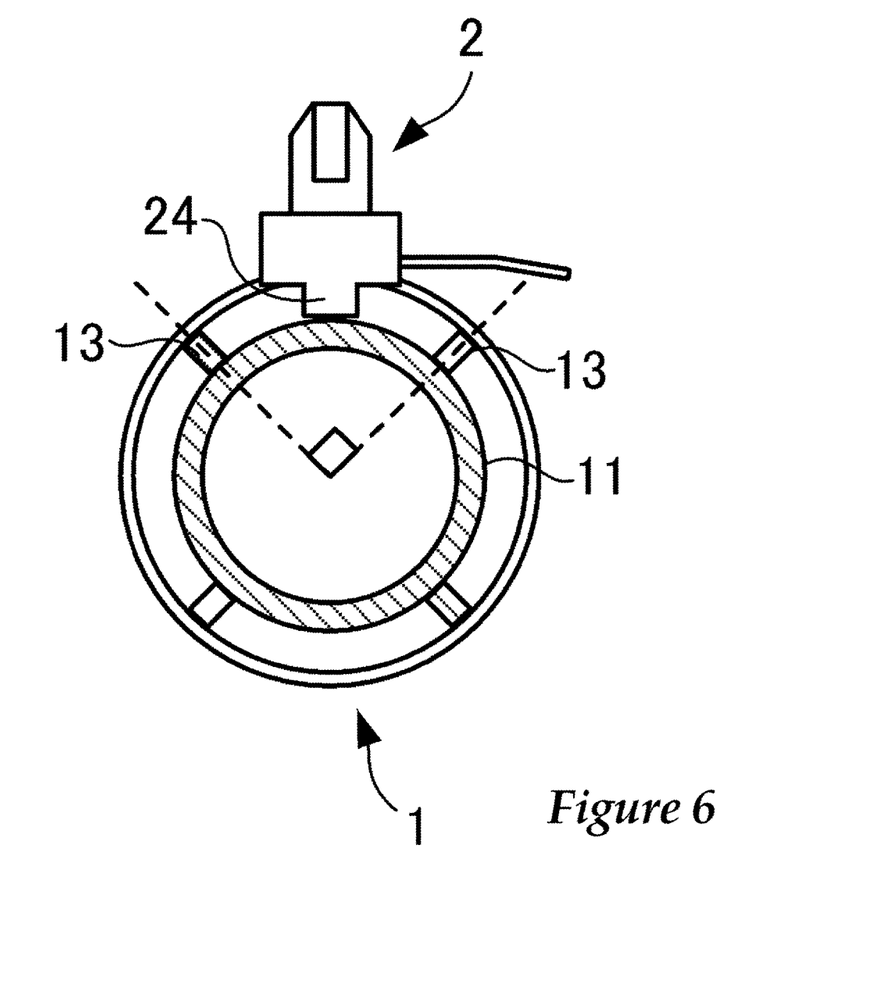
FIG. 6 is a partial cross-sectional view showing a situation in which the band clip has been attached to the corrugated tube according to one embodiment.

Also, the protruding portions 13 are each configured such that, when the band clip 2 is attached to the corrugated tube 1, the projecting portions 24 of the band clip 2 fitted into ring-shaped grooves 11 can engage with the protruding portion 13. Thus, the protruding portions 13 are configured such that, when the band clip 2 attached to the corrugated tube 1 rotates in the circumferential direction, the projecting portions 24 engage with a protruding portion 13 provided for any one of ring-shaped grooves 11 that are adjacent to each other as shown in FIG. 6, and the rotation of the band clip 2 is restricted, i.e., the movement in the circumferential direction is restricted.

Here, in the present embodiment, for each pair of ring-shaped grooves 11 that are adjacent to each other, two protruding portions 13 are arranged such that their respective phases are shifted by 90° from each other, and therefore the rotation of the band clip 2 is restricted within the range of a 90° angle in the circumferential direction. In the case where the attachment angle of the band clip 2 needs to be adjusted after the band clip 2 has been attached to the corrugated tube 1, it is possible to adjust the angle within the range between a protruding portion 13 provided for one ring-shaped groove 11 out of a pair of ring-shaped grooves 11 that are adjacent to each other and a protruding portion 13 provided for the other ring-shaped groove 11, i.e., within the range of 90° in the circumferential direction of the corrugated tube 1.

As described above, the structure for attaching a band clip to a corrugated tube according to the present embodiment is configured such that the projecting portions 24 of the band clip 2 are respectively fitted into a pair of ring-shaped grooves 11 of the corrugated tube 1 when the band clip 2 is attached to the corrugated tube 1. Also, the projecting portions 24 of the band clip 2 are configured such that, in the state of being fitted into a pair of ring-shaped grooves 11, the projecting portions 24 are restricted from moving in the circumferential direction due to the protruding portions 13, where two protruding portions 13 are provided for each of the pair of ring-shaped grooves 11 of the corrugated tube 1. Therefore, the structure for attaching a band clip to a corrugated tube according to the present embodiment is capable of preventing the band clip 2 attached to the corrugated tube 1 from rotating.

Also, in the structure for attaching a band clip to a corrugated tube according to the present embodiment, two protruding portions 13 provided for one ring-shaped grooves 11 out of a pair of ring-shaped grooves 11 that are adjacent to each other, and two protruding portions 13 provided for the other ring-shaped grooves 11, are arranged such that their respective phases are shifted from each other in the circumferential direction. Therefore, the projecting portions 24 each fitted into a ring-shaped groove 11 are allowed to move in the circumferential direction between a protruding portion 13 of one ring-shaped groove 11 and a protruding portion 13 of the other ring-shaped groove 11. Consequently, when attaching the corrugated tube 1 to the attachment target object 4, even if the attachment angle of the band clip 2 is displaced relative to the attachment target object 4, it is easy to adjust the attachment angle of the band clip 2 without twisting the corrugated tube 1.

Also, in the structure for attaching a band clip to a corrugated tube according to the present embodiment, two protruding portions 13 provided for one ring-shaped groove 11 out of a pair of ring-shaped grooves 11 that are adjacent to each other, and two protruding portions 13 provided for the other ring-shaped groove 11, are arranged such that their respective phases are shifted from each other in the circumferential direction by 90°. Therefore, the projecting portions 24 are allowed to move in the circumferential direction of the corrugated tube 1 within the range of 90°.

Also, two protruding portions 13, one for every 180° in the circumferential direction of the corrugated tube 1, are arranged such that the phases of the two protruding portions 13 of one ring-shaped groove 11 and the phases of the two protruding portions 13 of the other ring-shaped groove 11 that is adjacent to the ring-shaped groove 11 are shifted from each other by 90°. Therefore, the bending direction of one ring-shaped groove 11 of the corrugated tube 1 and the bending direction of the other ring-shaped groove 11 can be set to be orthogonal to each other. Consequently, it is possible to achieve balanced bendability of the corrugated tube 1, with which the corrugated tube 1 is free from the problem of being likely to bend only in one direction, and it is possible to ensure preferable bendability.

Figure 7:
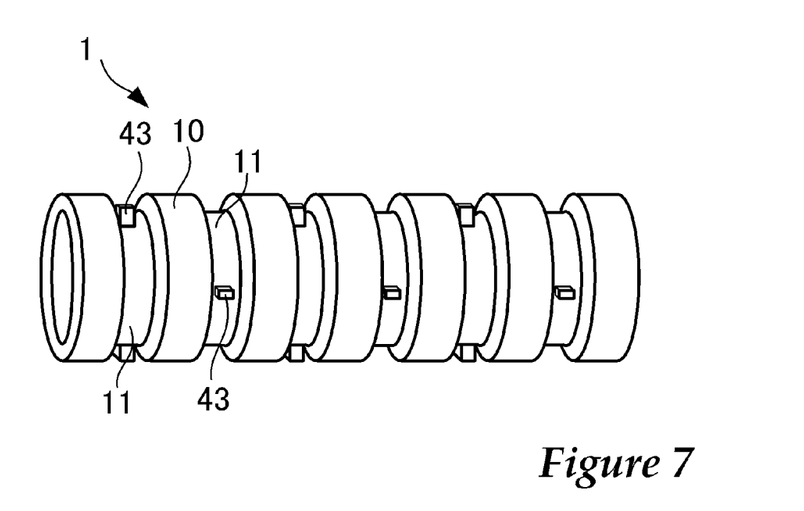
FIG. 7 is a perspective view of a modification of the corrugated tube according to one embodiment.

Although the protruding portions 13 of the corrugated tube 1 in the present embodiment each have a rib shape for coupling a pair of ring-shaped ribs 10 to each other in the axial direction, the present invention is not limited to this. For example, as shown in FIG. 7 and FIG. 8, protruding portions 43 that each have a projecting shape and that are each provided to be separated from the adjacent ring-shaped ribs 10 may be adopted.

Figure 8:
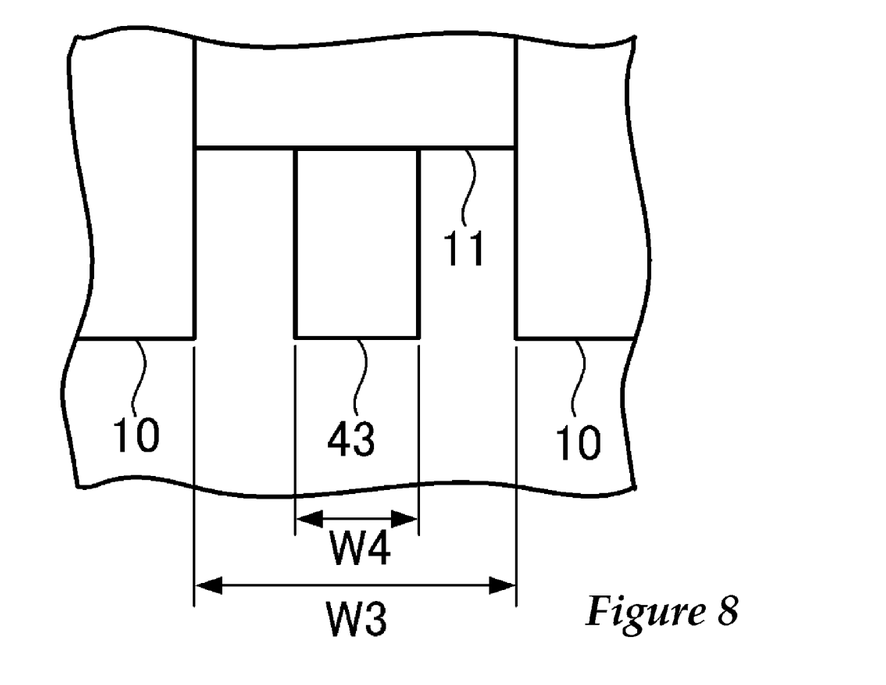
FIG. 8 is a plan view in which a primary part of the corrugated tube shown in FIG. 7 is enlarged.

Specifically, as shown in FIG. 8, widths W4, in the axial direction, of the protruding portions 43 according to this modification are set to be smaller than widths W3 of the ring-shaped grooves 11 in the axial direction. Therefore, it is possible to achieve a configuration in which each protruding portion 43 of the corrugated tube 1 does not come into contact with the pair of ring-shaped ribs 10 that the protruding portion 43 is adjacent to. Consequently, a gap is formed between each protruding portion 43 and the pair of ring-shaped ribs 10 that the protruding portion 43 is adjacent to, and the corrugated tube 1 is allowed to bend due to the presence of the gap. For this reason, it is possible to ensure preferable bendability of the corrugated tube 1.

Therefore, in the present modification, preferable bendability of the corrugated tube 1 can be ensured even if protruding portions 43 are provided for every ring-shaped groove 11 of the corrugated tube 1, and it is possible to increase the number of positions along the axial direction to which the band clip 2 can be attached. Therefore, it is possible to finely adjust the position in the axial direction at which the band clip 2 is to be attached to the corrugated tube 1.

Although the protruding portions 43 in the present modification each have a cubic shape, any shape may be adopted as long as the projecting portions 24 of the band clip 2 can be engaged with the protruding portions 43. For example, the protruding portions 43 in the present modification may each have a triangular shape when seen in the circumferential direction, and various shapes such as a columnar shape and a warhead shape may be adopted.

In the embodiment and the modification above, a description has been given of examples in which the projecting portions 24 are provided on the clip locking portion 23. However, the present invention is not limited to this, and the projecting portions 24 may be provided on the belt portion 22.

In the embodiment and the modification above, a description has been given of configurations in which protruding portions 13 or protruding portions 43 are provided for every ring-shaped groove 11 of the corrugated tube 1. However, the present invention is not limited to this. For example, a configuration may be adopted in which protruding portions 13 are provided for only a pair of ring-shaped grooves 11 that are adjacent to each other, with at least one ring-shaped rib 10, out of the plurality of ring-shaped ribs 10, being interposed therebetween, and no protruding portions 13 are provided for the other ring-shaped grooves 11. If this is the case, it is preferable that the widths, in the axial direction, of the ring-shaped grooves 11 which are not provided with protruding portions 13 are set to be smaller than the widths of the projecting portions 24 in the axial direction. With this configuration, when attaching the band clip 2 to the corrugated tube 1, it is possible to prevent the projecting portions 24 of the band clip 2 from being mistakenly fitted into ring-shaped grooves 11 in which no protruding portions 13 are provided.

In the embodiment and the modification above, a description has been given of examples in which the pair of ring-shaped grooves 11 into which the two projecting portions 24 of the band clip 2 are fitted are symmetrically arranged so as to be adjacent to each other, with one ring-shaped rib 10 being interposed therebetween. However, the present invention is not limited to this. For example, the pair of ring-shaped grooves 11 may be symmetrically arranged so as not to be adjacent to, and so as to be separated from, one ring-shaped rib 10 interposed therebetween. For example, it is preferable that ring-shaped grooves 11 that are each separated by one ring-shaped rib 10 in the axial direction at a distance corresponding to two or more ring-shaped grooves 11 serve as the pair of ring-shaped grooves 11 into which the projecting portions 24 are fitted. If this is the case, the distance W1 between the two projecting portions 24 of the band clip 2 in the axial direction is set according to the distance between a pair of ring-shaped grooves 11 that are symmetrically arranged so as to be separated by one ring-shaped rib 10. In such an example, protruding portions 13 may be provided for every ring-shaped groove 11 of the corrugated tube 1, or a configuration may be adopted in which protruding portions 13 are provided only in the pair of ring-shaped grooves 11 into which the projecting portions 24 are fitted. Even if this is the case, however, the protruding portions 13 of one ring-shaped groove 11 and the protruding portions 13 of the other ring-shaped groove 11 are arranged such that their respective phases are shifted from each other in the circumferential direction.

As described above, the structure for attaching a band clip to a corrugated tube according to embodiment is easy to adjust the attachment angle of the band clip without twisting the corrugated tube, while the band clip attached to the corrugated tube is prevented from rotating, and is applicable to various kinds of structures for attaching a band clip to a corrugated tube.

REFERENCE SIGNS LIST

1 Corrugated tube
2 Band clip
4 Attachment target object
10 Ring-shaped rib
11 Ring-shaped groove
13 Protruding portion
16 Rib
21 Clip portion
22 Belt portion
23 Clip locking portion
23a Belt insertion hole
24 Projecting portion
43 Protruding portion
W1 Distance
W2 Width
W3 Width
W4 Width

The invention claimed is:

1. A structure for attaching a band clip to a corrugated tube, comprising:
a corrugated tube that has a plurality of ring-shaped ribs and a plurality of ring-shaped grooves, and that is for enclosing a wire harness; and
a band clip for fixing the corrugated tube to an attachment target object, wherein
the band clip has a plurality of projecting portions that project toward an outer circumferential surface of the corrugated tube when the band clip is attached to the corrugated tube, and that are arranged to be separated from each other such that a distance therebetween in an axial direction of the corrugated tube is greater than or equal to widths of the ring-shaped ribs in the axial direction,
the corrugated tube is configured such that the projecting portions are respectively fittable into a pair of ring-shaped grooves that are symmetrically arranged with at least one ring-shaped rib, out of the plurality of ring-shaped ribs, being interposed therebetween,
the pair of ring-shaped grooves are each provided with a plurality of protruding portions that are engageable with the projecting portions and that are arranged at predetermined intervals in a circumferential direction, and
the plurality of protruding portions provided for one ring-shaped groove out of the pair of ring-shaped grooves, and the plurality of protruding portions provided for the other ring-shaped groove, are arranged such that respective phases thereof are shifted from each other in the circumferential direction.

2. The structure for attaching a band clip to a corrugated tube according to claim 1, wherein:
the protruding portions are provided such that two protruding portions, one for every 180°, are provided for each of the pair of ring-shaped grooves, and
the protruding portions provided for the one ring-shaped groove and the protruding portions provided for the other ring-shaped groove are arranged such that respective phases thereof are shifted from each other by 90° in the circumferential direction.

3. The structure for attaching a band clip to a corrugated tube according to claim 1, wherein:
widths of the protruding portions in the axial direction are set to be smaller than widths of the ring-shaped grooves in the axial direction.

4. The structure for attaching a band clip to a corrugated tube according to claim 2, wherein:
widths of the protruding portions in the axial direction are set to be smaller than widths of the ring-shaped grooves in the axial direction.

* * * * *